(12) United States Patent
Morita et al.

(10) Patent No.: US 9,276,444 B2
(45) Date of Patent: Mar. 1, 2016

(54) ROTOR AND MOTOR

(71) Applicant: ASMO CO., LTD., Shizuoka-ken (JP)

(72) Inventors: Chie Morita, Kosai (JP); Yoji Yamada, Hamamatsu (JP)

(73) Assignee: Asmo Co., Ltd., Shizuoka-ken (JP)

( * ) Notice: Subject to any disclaimer, the term of this patent is extended or adjusted under 35 U.S.C. 154(b) by 384 days.

(21) Appl. No.: 13/761,772

(22) Filed: Feb. 7, 2013

(65) Prior Publication Data

US 2013/0207503 A1 Aug. 15, 2013

(30) Foreign Application Priority Data

Feb. 15, 2012 (JP) ................................ 2012-030752
Mar. 5, 2012 (JP) ................................ 2012-048173
Mar. 5, 2012 (JP) ................................ 2012-048174

(51) Int. Cl.
*H02K 1/27* (2006.01)
(52) U.S. Cl.
CPC ............ *H02K 1/2713* (2013.01); *H02K 1/2706* (2013.01); *H02K 1/2773* (2013.01)
(58) Field of Classification Search
CPC ...... H02K 1/145; H02K 1/243; H02K 21/044
USPC .................. 310/257, 263, 61, 156.66, 156.68, 310/156.69, 156.71, 156.72, 156.73
See application file for complete search history.

(56) References Cited

U.S. PATENT DOCUMENTS

| 5,907,209 | A  | * | 5/1999  | Ishida ........................... 310/263 |
| 6,265,802 | B1 |   | 7/2001  | Getschmann |
| 7,385,322 | B2 | * | 6/2008  | Park ............................... 310/61 |
| 2002/0011757 | A1 | * | 1/2002  | Tanaka et al. ................. 310/263 |
| 2004/0178696 | A1 | * | 9/2004  | Tajima et al. ................. 310/263 |
| 2006/0186752 | A1 |   | 8/2006  | Matsumoto et al. |
| 2006/0186754 | A1 | * | 8/2006  | Kitamura et al. ............. 310/263 |
| 2008/0079330 | A1 |   | 4/2008  | Ishida et al. |
| 2008/0315714 | A1 | * | 12/2008 | Badey et al. ................. 310/261 |
| 2011/0001374 | A1 | * | 1/2011  | Inoue et al. .................... 310/71 |
| 2011/0006633 | A1 | * | 1/2011  | Itoh et al. ................. 310/156.66 |
| 2012/0032552 | A1 |   | 2/2012  | Filgertshofer |

FOREIGN PATENT DOCUMENTS

| JP | S48038310  | U  | 9/1971 |
| JP | S58007821  | Y2 | 2/1983 |
| JP | 5-43749    |    | 6/1993 |
| JP | H07312852  | A  | 11/1995 |
| JP | 11206052   | A  | 7/1999 |

(Continued)

OTHER PUBLICATIONS

English language abstract for JP H11206052 A (1997).

(Continued)

*Primary Examiner* — Naishadh Desai
(74) *Attorney, Agent, or Firm* — Caesar Rivise, PC

(57) ABSTRACT

A rotor includes a first rotor core, a second rotor core, a field magnet, and an adhesive. The first rotor core includes a first core base, having a first magnet fixing surface, and a plurality of first claw-poles. The second rotor core includes a second core base having a second magnet fixing surface, and a plurality of second claw-poles. The field magnet includes a first axial end face and a second axial end face. At least one of the first magnet fixing surface and the first axial end face includes a first adhesive recess that receives an adhesive. At least one of the second magnet fixing surface and the second axial end face includes a second adhesive recess that receives the adhesive.

13 Claims, 12 Drawing Sheets

(56) References Cited

FOREIGN PATENT DOCUMENTS

| | | | |
|---|---|---|---|
| JP | 2000270505 A | 9/2000 |
| JP | 2001346346 A | 12/2001 |
| JP | 2004364474 A | 12/2004 |
| JP | 2005065388 A | 3/2005 |
| JP | 2006238584 A | 9/2006 |
| JP | 2006254599 A | 9/2006 |
| JP | 2006288200 A | 10/2006 |
| JP | 2008092673 A | 4/2008 |
| JP | 2010213455 A | 9/2010 |
| JP | 2012039859 A | 2/2012 |
| WO | 2012067223 A1 | 5/2012 |

OTHER PUBLICATIONS

English language abstract for JP 2004364474 A (2004).
English language abstract for JP 2005065388 A (2005).
English language abstract for JP 2006288200 A (2006).
English language abstract for JP H07312852 A (1995).
English language abstract for JP S48038310 U (1971).
Concise English language explanation of relevance of JP S58007821 Y2 (1977).
English language abstract for JP 2000270505 A (2000).
English language abstract for JP 2001346346 A (2001).
English language abstract for JP 2006254599 A (2006).
English language abstract for JP 2008092673 A (2008).
English language abstract for JP 2010213455 A (2010).
English language abstract for JP 2012039859 A (2012).
English language translation of Japan Office Action dated Jun. 30, 2015.
English language translation of Japan Office Action dated Jul. 2, 2015.
Japan Office Action dated Jun. 30, 2015.
Japan Office Action dated Jul. 2, 2015.

* cited by examiner

ROTOR AND MOTOR

BACKGROUND OF THE INVENTION

The present invention relates to a rotor and a motor.

A so-called Lundell type rotor (see e.g., Japanese Laid-Open Utility Model Publication No. 5-43749) is known as a rotor used in a motor. The Lundell type rotor includes two rotor cores and a field magnet. The rotor cores are combined with each other and each include a plurality of claw-poles arranged along a circumferential direction. The field magnet is arranged between the two rotor cores so that the claw-poles alternately function as different poles. Such a rotor includes a rotation shaft inserted through and fixed to each of the two rotor cores to integrally rotate the rotation shaft and the rotor core.

In the Lundell type rotor, the two rotor cores and the field magnet arranged in between are adhered and fixed to one another with an adhesive. Thus, an adhesive layer (layer of adhesive) between the rotor cores and the field magnet produces a magnetic resistance. The magnetic resistance between the rotor cores and the field magnet increases as the thickness of the adhesive layer increases. This lowers the motor performance, that is, decreases the motor output. When reducing the thickness of the adhesive layer and decreasing the gap (distance) between the rotor core and the field magnet to avoid such a situation, it becomes difficult to obtain the desired adhesive force.

Further, in the Lundell type rotor, the magnetic flux extending from the field magnet to the claw-poles of the rotor cores functions as an effective magnetic flux that generates torque for the rotor. In contrast, the magnetic flux extending from the rotor cores to the rotation shaft is a short-circuit magnetic flux. The effective magnetic flux decreases the short-circuit magnetic flux and thereby lowers the motor output. In the Lundell type rotor, a magnetic path extending from the field magnet via the rotor cores to the rotation shaft has a tendency of being shorter than the magnetic path extending from the field magnet to the claw-poles. Thus, the short-circuit magnetic flux from the rotor cores to the rotation shaft has a tendency of increasing, and the problem of reduction in the motor output becomes especially prominent.

SUMMARY OF THE INVENTION

It is an object of the present invention to provide a rotor and a motor capable of suppressing reductions in the motor output.

To achieve the above object, a rotor according to a first aspect of the present invention includes an axial direction, a circumferential direction, and a radial direction. The rotor includes a first rotor core, a second rotor core, a field magnet, and an adhesive. The first rotor core includes a disk-shaped first core base, having a first magnet fixing surface, and a plurality of first claw-poles, arranged at equal intervals on an outer circumferential portion of the first core base. Each of the first claw-poles projects outward in the radial direction and extends in the axial direction. The second rotor core includes a disk-shaped second core base, having a second magnet fixing surface, and a plurality of second claw-poles, arranged at equal intervals on an outer circumferential portion of the second core base. Each of the second claw-poles projects outward in the radial direction and extends in the axial direction, and each of the second claw-poles is arranged between adjacent ones of the first claw-poles. The field magnet is arranged between the first core base and the second core base in the axial direction, and includes a first axial end face, facing the first magnet fixing surface, and a second axial end face, facing the second magnet fixing surface. The field magnet is magnetized in the axial direction so that the first claw-poles function as first poles and the second claw-poles function as second poles. The adhesive adheres the first magnet fixing surface and the first axial end face, and the second magnet fixing surface and the second axial end face. At least one of the first magnet fixing surface and the first axial end face includes a first adhesive recess, which is depressed in the axial direction and receives the adhesive. At least one of the second magnet fixing surface and the second axial end face includes a second adhesive recess, which is depressed in the axial direction and receives the adhesive.

A rotor according to a second aspect of the present invention includes an axial direction, a circumferential direction, and a radial direction. The rotor includes a first rotor core, a second rotor core, a field magnet, and a rotary shaft. The first rotor core includes a disk-shaped first core base, having a first insertion hole extending in the axial direction, and a plurality of first claw-poles, arranged at equal intervals on an outer circumferential portion of the first core base. Each of the first claw-poles projects outward in the radial direction and extends in the axial direction. The second rotor core includes a disk-shaped second core base, having a second insertion hole extending in the axial direction, and a plurality of second claw-poles, arranged at equal intervals on an outer circumferential portion of the second core base. Each of the second claw-poles projects outward in the radial direction and extends in the axial direction, and each of the second claw-poles is arranged between adjacent ones of the first claw-poles. The field magnet is arranged between the first core base and the second core base in the axial direction. The field magnet is magnetized in the axial direction so that the first claw-poles function as first poles and the second claw-poles function as second poles. The rotation shaft is inserted through the first and second insertion holes to extend in the axial direction. The rotation shaft is fixed to inner circumferential walls of the insertion holes. Each of the first and second core bases includes, on the inner circumferential wall of the corresponding insertion hole, supporting projections that project inward in the radial direction and contact the rotation shaft.

A rotor according to a third aspect of the present invention includes an axial direction, a circumferential direction, and a radial direction. The rotor includes a first rotor core, a second rotor core, a field magnet, and a rotary shaft. The first rotor core includes a disk-shaped first core base, having a first insertion hole extending in the axial direction, and a plurality of first claw-poles, arranged at equal intervals on an outer circumferential portion of the first core base. Each of the first claw-poles projects outward in the radial direction and extends in the axial direction. The second rotor core includes a disk-shaped second core base, having a second insertion hole extending in the axial direction, and a plurality of second claw-poles, arranged at equal intervals on an outer circumferential portion of the second core base. Each of the second claw-poles projects outward in the radial direction and extends in the axial direction, and each of the second claw-pole is arranged between adjacent ones of the first claw-poles. The field magnet includes a through-hole extending in the axial direction and is arranged between the first core base and the second core base in the axial direction. The field magnet is magnetized in the axial direction so that the first claw-poles function as first poles and the second claw-poles function as second poles. A rotation shaft is inserted through the first and second insertion holes and the through-hole to extend in the axial direction. The rotation shaft is fixed to inner circumferential walls of the first and second insertion holes. The through-hole has a diameter that is larger than a diameter of the rotation shaft. The inner circumferential wall of each of the first and second insertion holes includes a fixing portion, which is fixed to the rotation shaft, and a separated portion, which is located closer to the field magnet than the fixing portion and which is separated from the rotation shaft in the radial direction.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to FIGS. 1 to 7C.

Figure 1:
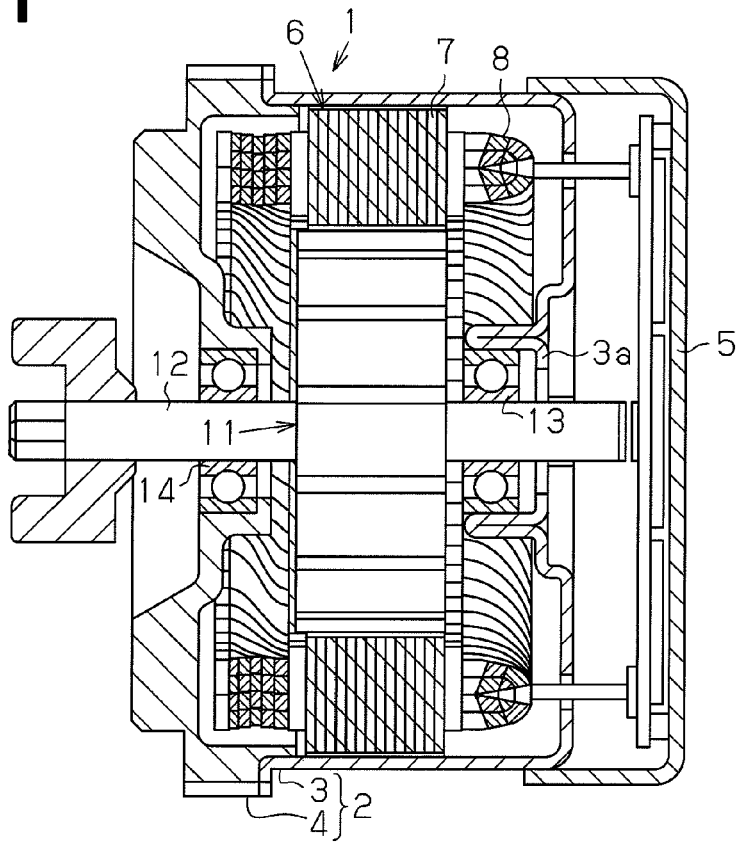
FIG. 1 is a cross-sectional view of a motor according to a first embodiment of the present invention.
Figure 2:
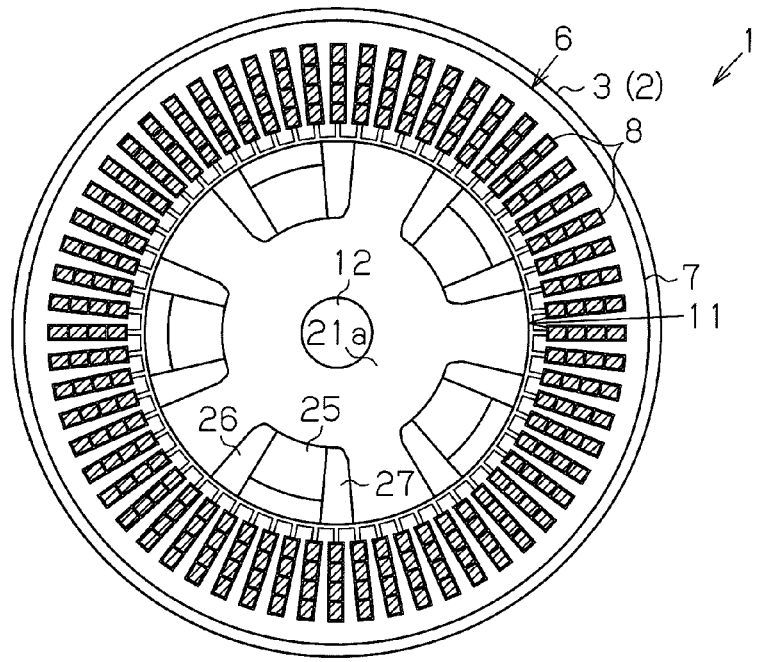
FIG. 2 is a plan view of the motor of FIG. 1.

As shown in FIGS. 1 and 2, a motor 1 includes a motor case 2. The case 2 includes a tubular housing 3, which has a closed end, and a front end plate 4, which closes a front opening (left side in FIG. 1) of the tubular housing 3. A circuit accommodation box 5, accommodating a power supply circuit such as a circuit substrate and the like, is attached to a rear end (right side in FIG. 1) of the tubular housing 3. A stator 6 is fixed to an inner circumferential surface of the tubular housing 3. The stator 6 includes an armature core 7, which have a plurality of teeth extending inward in the radial direction, and a plurality of segment conductor (SC) windings 8, which are wound around the teeth of the armature core 7. A rotor 11 of the motor 1 includes a rotation shaft 12, and is in the stator 6. The rotation shaft 12 is a non-magnetic metal shaft and rotatably supported by bearings 13 and 14, which are supported by a bottom portion 3a of the tubular housing 3 and the front end plate 4.

Figure 3:
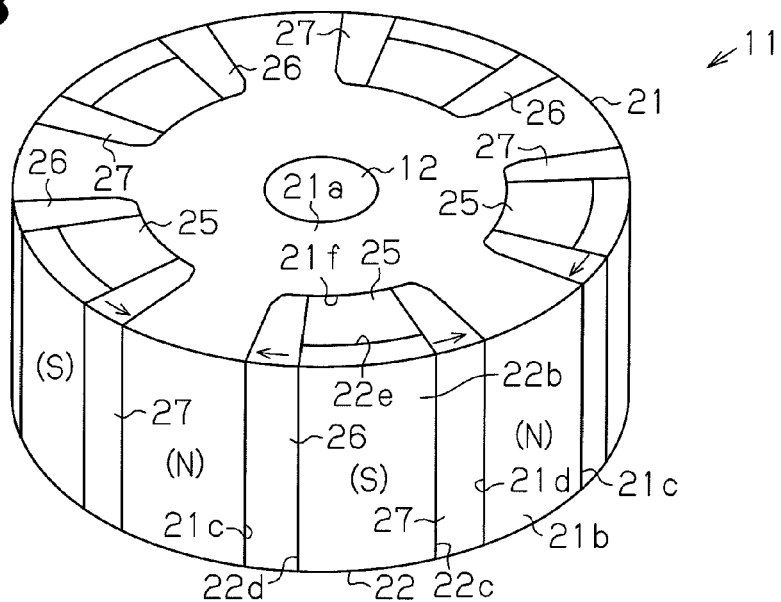
FIG. 3 is a perspective view of a rotor of FIG. 1.
Figure 4:
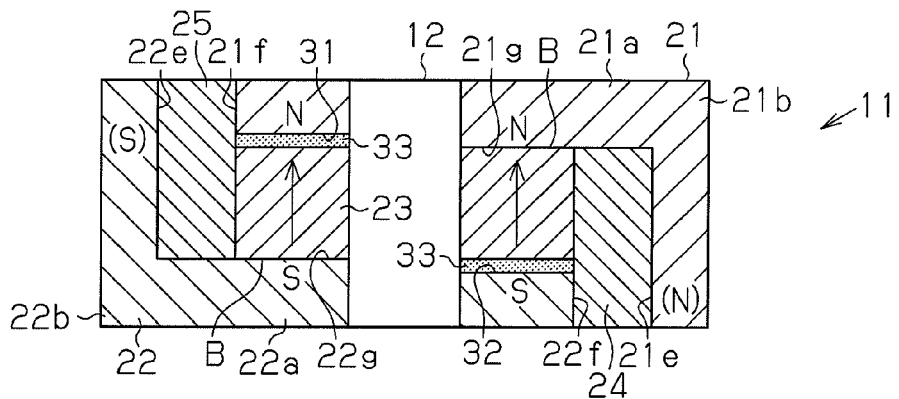
FIG. 4 is a cross-sectional view of the rotor of FIG. 3.

As shown in FIGS. 3 and 4, the rotor 11 includes first and second rotor cores 21 and 22, an annular magnet 23 (refer to FIG. 4) serving as a field member, first and second rear surface auxiliary magnets 24 and 25, and inter-pole magnets 26 and 27. The arrows shown in solid lines in FIGS. 3 and 4 indicate the magnetization direction (direction from S pole to N pole) of the magnets 23, 24, 25, 26, and 27.

Figure 6:
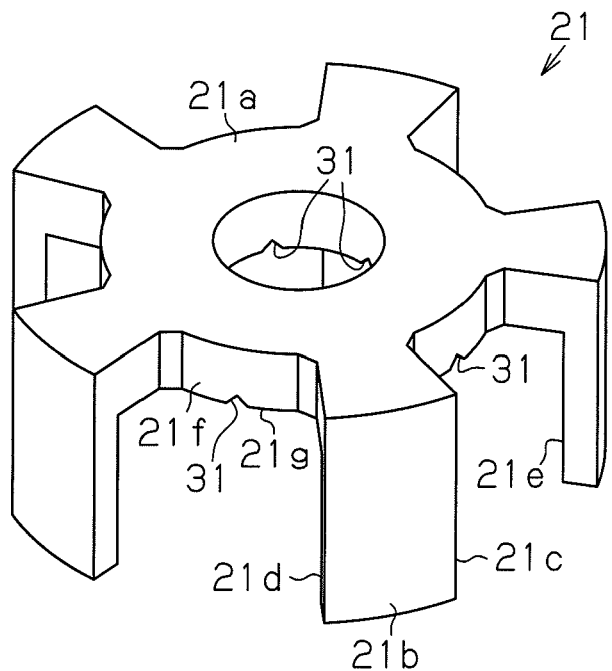
FIG. 6 is a perspective view of a rotor core of FIG. 3.
Figure 6:
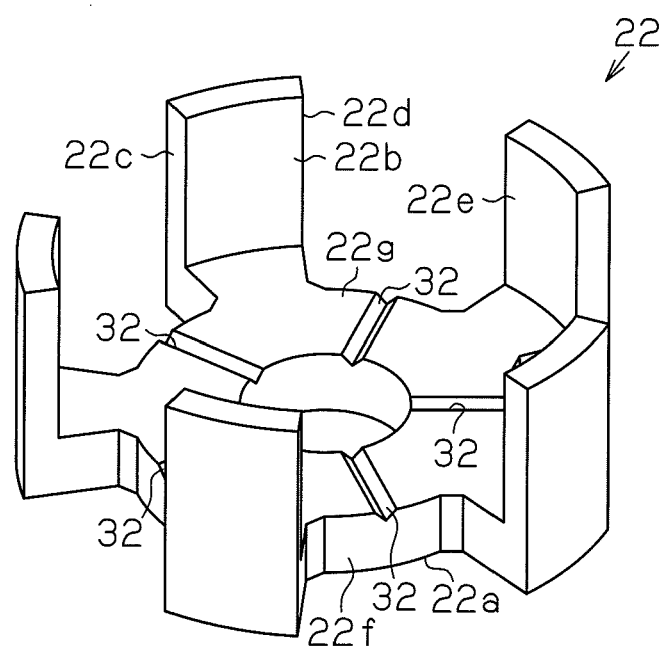

As shown in FIGS. 3, 4, and 6, the first rotor core 21 includes a generally disk-shaped first core base 21a, and a plurality of (five in the present embodiment) first claw-poles 21b arranged at equal intervals in an outer circumferential portion of the first core base 21a. Each first claw-pole 21b projects outward in the radial direction from the first core base 21a and extends in the axial direction. The first claw-pole 21b includes circumferential end faces 21c and 21d that are flat surfaces extending in the radial direction (not inclined relative to the radial direction as viewed from the axial direction). The first claw-pole 21b has a sector-shaped cross-section in a direction orthogonal to the axial direction. The angle in the circumferential direction of each first claw-pole 21b, that is, the angle between the circumferential end faces 21c and 21d is set to be smaller than the angle of the gap between the first claw-poles 21b that are adjacent in the circumferential direction.

The second rotor core 22, which is identical in shape with the first rotor core 21, includes a generally disk-shaped second core base 22a and a plurality of second claw-poles 22b arranged at equal intervals in an outer circumferential portion of the second core base 22a. Each second claw-pole 22b projects outward in the radial direction from the second core base 22a and extends in the axial direction. The second claw-pole 22b includes circumferential end faces 22c and 22d that are flat surfaces extending in the radial direction. The second claw-pole 22b has a sector-shaped cross-section in a direction orthogonal to the axial direction. The angle in the circumferential direction of each second claw-pole 22b, that is, the angle between the circumferential end faces 22c and 22d is set to be smaller than the angle of the gap between the second claw-poles 22b that are adjacent in the circumferential direction. The second rotor core 22 is coupled to the first rotor core 21 such that each second claw-pole 22b is arranged between adjacent first claw-poles 21b, and the annular magnet 23 (refer to FIG. 4) is arranged (sandwiched) between the first core base 21a and the second core base 22a in the axial direction. In this case, one circumferential end face 21c of the first claw-pole 21b and the other circumferential end face 22d of the second claw-pole 22b are parallel along the axial direction. Thus, the gap between the end faces 21c and 22d is substantially linear and extends along the axial direction. Further, the other circumferential end face 21d of the first claw-pole 21b and one circumferential end face 22c of the second claw-pole 22b are parallel along the axial direction. Thus, the gap between the end faces 21d and 22c is substantially linear and extends along the axial direction.

Referring to FIG. 4, the annular magnet 23 has an outer diameter set to be the same as the outer diameters of the first and second core bases 21a and 22a, and the annular magnet 23 is magnetized in the axial direction so that the first claw-poles 21b function as first poles (N poles in the present embodiment) and the second claw-poles 22b function as second poles (S poles in the present embodiment). Therefore, the rotor 11 of the present embodiment is a so-called Lundell type rotor that uses the annular magnet 23 as a field magnet. The rotor 11 includes the first claw-poles 21b, which form the N poles, and the second claw-poles 22b, which form the S poles. The first claw-poles 21b and the second claw-poles 22b are alternately arranged in the circumferential direction. The number of poles is ten (number of pole pairs is five). Since the number of pole pairs is an odd number and greater than or equal to three, the claw-poles of the same pole are not arranged at opposing positions of 180° in the circumferential direction when viewing the entire rotor core. This obtains a shape that provides stability with respect to magnetic vibration.

The first rear surface auxiliary magnets 24 are arranged between rear surfaces 21e (radially inner surface) of the first claw-poles 21b and an outer circumferential surface 22f of the second core base 22a. The first rear surface auxiliary magnet 24 has a sector-shaped cross-section in a direction orthogonal to the axial direction, and is magnetized so that the vicinity of a surface in contact with the rear surface 21e of the first claw-pole 21b forms the N pole, which is the same pole as the first claw-pole 21b, and the vicinity of the surface in contact with the outer circumferential surface 22f of the second core base 22a forms the S pole, which is the same pole as the second core base 22a.

In the same manner as the first claw-pole 21b, the second rear surface auxiliary magnets 25 are arranged on rear surfaces 22e of the second claw-poles 22b. Ferrite magnets, for example, are used as the first rear surface auxiliary magnets 24 and the second rear surface auxiliary magnets 25. The second rear surface auxiliary magnet 25 has a sector-shaped cross-section in a direction orthogonal to the axial direction, and is magnetized so that the vicinity of a surface in contact with the rear surface 22e forms the S pole, and the vicinity of a surface in contact with an outer circumferential surface 21f of the first core base 21a forms the N pole.

The first rear surface auxiliary magnet 24 and the second rear surface auxiliary magnet 25 have an axial length set to overlap each other at an axial position of the rotor 11 where the annular magnet 23 is arranged. In other words, the axial lengths of the first rear surface auxiliary magnets 24 and the second rear surface auxiliary magnets 25 are set so that the first rear surface auxiliary magnets 24 and the second rear surface auxiliary magnets 25 extend from the two surfaces of the rotor 11 until reaching the axial position where the annular magnet 23 is arranged.

As shown in FIG. 3, the inter-pole magnets 26 and 27 are arranged in the circumferential direction of the first claw-poles 21b and the second claw-poles 22b. Specifically, the first inter-pole magnets 26 are fitted and fixed between flat surfaces, formed by the circumferential end faces 21c of the first claw-poles 21b and the circumferential end faces of the first rear surface auxiliary magnets 24, and flat surfaces, formed by the other circumferential end faces 22d of the second claw-poles 22b and the circumferential end faces of the second rear surface auxiliary magnets 25.

The second inter-pole magnets 27 are identical in shape with the first inter-pole magnets 26, and are fitted and fixed between flat surfaces, formed by the circumferential end face 21d of the first claw-pole 21b and the circumferential end faces of the first rear surface auxiliary magnets 24, and flat surfaces, formed by the circumferential end faces 22c of the second claw-poles 22b and the circumferential end faces of the second rear surface auxiliary magnets 25. The first and second inter-pole magnets 26 and 27 are magnetized in the circumferential direction so that those having the same polarity as the first and second claw-poles 21b and 22b face each other (so that the first claw-pole 21b is the N pole, and the second claw-pole 22b is the S pole).

Figure 5:
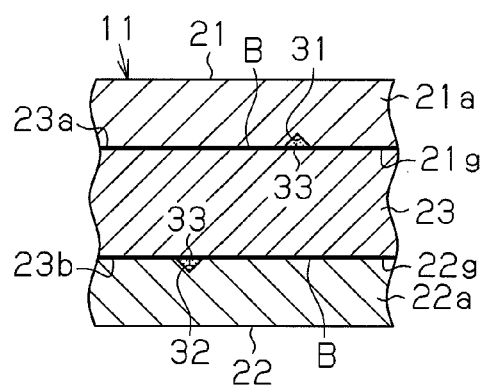
FIG. 5 is a cross-sectional view schematically showing an adhering portion of first and second core bases and an annular magnet of FIG. 4.

As shown in FIGS. 4, 5, and 6, in the rotor 11 described above, a first slit 31 (first adhesive recess) and a second slit 32 (second adhesive recess) are respectively formed in an axially inner side of the first core base 21a of the first rotor core 21 and an axially inner side of the second core base 22a of the second rotor core 22. Since the first rotor core 21 and the second rotor core 22 are identical in shape, the second slit 32 of the second rotor core 22 will be described in detail below, and the first slit 31 of the first rotor core 21 will not be described in detail.

Five second slits 32 are formed in correspondence with the number of second claw-poles 22b in a magnet fixing surface 22g (end face on the axially inner side) of the second core base 22a (refer to FIG. 6). Each second slit 32 is a groove having a V-shaped cross-section, and formed to linearly extend along the radial direction from a radially inner end toward a radially outer end of the magnet fixing surface 22g. The second slit 32 are arranged between the second claw-poles 22b in the circumferential direction. That is, one second slit 32 is arranged between circumferentially adjacent second claw-poles 22b in the magnet fixing surface 22g. The second slits 32 are formed at equal intervals in the circumferential direction, and at circumferentially central positions between the adjacent second claw-poles 22b. The structure of the first slits 31 formed in a magnet fixing surface 21g of the first core base 21a are similar to that of the second slits 32.

As shown in FIG. 5, an adhesive 33 adheres the first and second core bases 21a and 22a to the annular magnet 23. Specifically, the opposing magnet fixing surface 21g of the first core base 21a and a first axial end face 23a of the annular magnet 23 are adhered, and the opposing magnet fixing surface 22g of the second core base 22a and a second axial end face 23b of the annular magnet 23 are adhered. The adhesive 33 is received in each first slit 31 and each second slit 32. An adhesive layer B, which is formed by thinly spreading out the adhesive 33, is formed between the annular magnet 23 and the magnet fixing surfaces 21g and 22g of the first and second core bases 21a and 22a outside the first and second slits 31 and 32. As above, in the present embodiment, the magnet fixing surfaces 21g and 22g include the first and second slits 31 and 32, which receive the adhesive 33. This increases the area of contact between the adhesive 33 and the magnet fixing surfaces 21g and 22g. This obtains adhesive force of the first and second core bases 21a and 22a and the annular magnet 23.

In the motor 1, when a three-phase drive current is supplied to the segment conductor (SC) winding 8 through the power supply circuit in the circuit accommodation box 5, the stator 6 generates a magnetic field that rotates and drives the rotor 11.

The operation of the motor 1 will now be described.

In the rotor 11 of the motor 1 of the present embodiment, the first and second slits 31 and 32, which receive the adhesive 33, are formed in the magnet fixing surfaces 21g and 22g of the first and second core bases 21a and 22a, respectively. This obtains adhesive force between the magnet fixing surfaces 21g and 22g and the annular magnet 23 where the first and second slits 31 and 32 are arranged, and increases the area of contact with the adhesive 33. This allows the adhesive layer B to have a minimized thickness outside the first and second slits 31 and 32 between the magnet fixing surfaces 21g and 22 and the annular magnet 23. Thus, the gap (distance) between the annular magnet 23 and the first and second core bases 21a and 22a can be reduced.

The first slits 31 are arranged between the first claw-poles 21b, and the second slits 32 are arranged between the second claw-poles 22b. Radially inner portions of the first and second claw-poles 21b and 22b in the first and second core bases 21a and 22a form magnetic paths extending from the annular magnet 23 to the first and second claw-poles 21b and 22b. The first and second slits 31 and 32 are separated from the magnetic paths in the present embodiment. In other words, the first and second slits 31 and 32 are arranged in the first and second core bases 21a and 22a where the amount of magnetic flux passing by is small. This suppresses magnetic loss that may occur when arranging the first and second slits 31 and 32 in the magnet fixing surfaces 21g, 22g. In the present embodiment, the first slits 31 are arranged between the first claw-poles 21b, while the second slits 32 are arranged between the second claw-poles 22b, respectively, and the first and second slits 31 and 32 are formed to be groove-shaped and extend from the radially inner side to the radially outer side. This efficiently distributes the magnetic flux of the annular magnet 23 to the first claw-poles 21b and the second claw-poles 22b, and thereby improves the motor performance, that is, the motor output.

The first embodiment has the advantages described below.

(1) The first slits 31 (first adhesive recesses), which are depressed in the axial direction and which receive the adhesive 33, are arranged in the magnet fixing surface 21g of the first core base 21a, and the second slits 32 (second adhesive recesses), which are depressed in the axial direction and which receive the adhesive 33, are arranged in the magnet fixing surface 22g of the second core base 22a. The adhesive 33 received in the first and second slits 31 and 32 adhere the first and second core bases 21a and 22a to the annular magnet 23. This allows the adhesive layer B to have a minimized thickness outside the first and second slits 31 and 32 between the first and second core bases 21a and 22a and the axial end faces 23a and 23b of the annular magnet 23 thus becomes thin as possible, whereby the gap between the first and second rotor cores 21, 22 and the annular magnet 23. As a result, an increase in the magnetic resistance between the first and second rotor cores 21 and 22 and the annular magnet 23 is suppressed, and a decrease in the motor performance, or the motor output, is suppressed.

(2) The first slits 31 are arranged between the first claw-poles 21b, and the second slits 32 are arranged between the second claw-poles 22b. The first and second slits 31 and 32 are thus separated from magnetic paths extending from the annular magnet 23 to the first and second claw-poles 21b and 22b in the first and second core bases 21a and 22a (radially inner portions of the first and second claw-poles 21b, 22b). In other words, the first and second slits 31 and 32 are arranged where the amount of magnetic flux is small in the first and second core bases 21a and 22a, thereby suppressing magnetic loss caused by the first and second slits 31 and 32.

(3) The first and second slits 31 and 32 are groove-shaped and extend from the radially inner side to the radially outer side. This balances the first and second core bases 21a and 22a and the annular magnet 23 in the radial direction. Since the first and second slits 31 and 32 are respectively arranged between the first claw-poles 21b and between the second claw-poles 22b in the present embodiment, the magnetic flux of the annular magnet 23 is efficiently distributed to the first claw-poles 21b and the second claw-poles 22b. This improves the motor performance.

(4) The first and second slits 31 and 32 are respectively arranged at equal intervals in the circumferential direction. Thus, the first and second core bases 21a and 22a and the annular magnet 23 are adhered in a balanced manner in the radial direction. The first and second slits 31 and 32 are groove-shaped and extend from the radially inner side to the radially outer side, and the first and second slits 31 and 32 are respectively arranged between the first and second claw-poles 21b and 22b. Thus, the magnetic flux of the annular magnet 23 is efficiently distributed to the first claw-poles 21b and the second claw-poles 22b. This improves the motor performance.

The first embodiment of the present invention may be modified as described below.

In the first embodiment, the first and second slits 31, 32 linearly extend along the radial direction from the radially inner end to the radially outer end of the magnet fixing surfaces 21g and 22g but are not limited in such a manner. For example, the first and second slits 31 and 32 do not have to extend from the radially inner end to the radially outer end of the magnet fixing surfaces 21g and 22g.

Figure 7A:
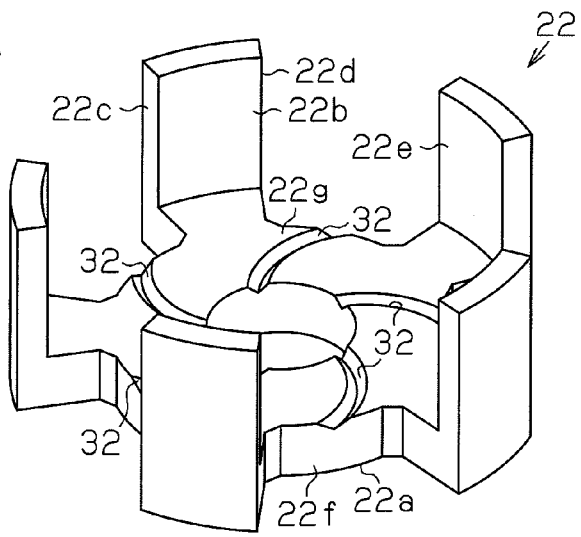
FIGS. 7A to 7C are perspective views showing other examples of the rotor core.
Figure 7B:
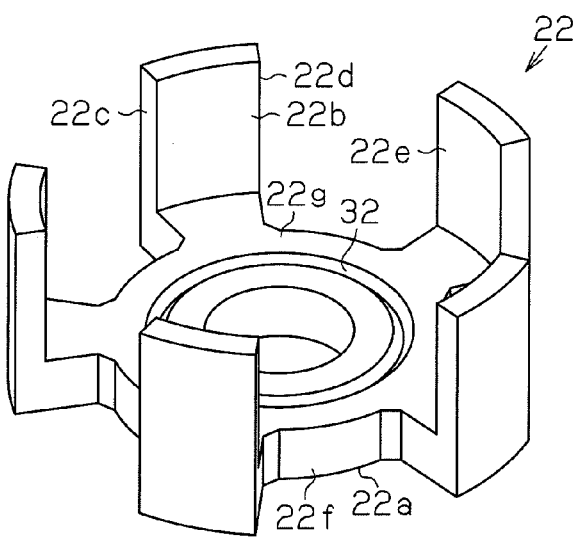
Figure 7C:
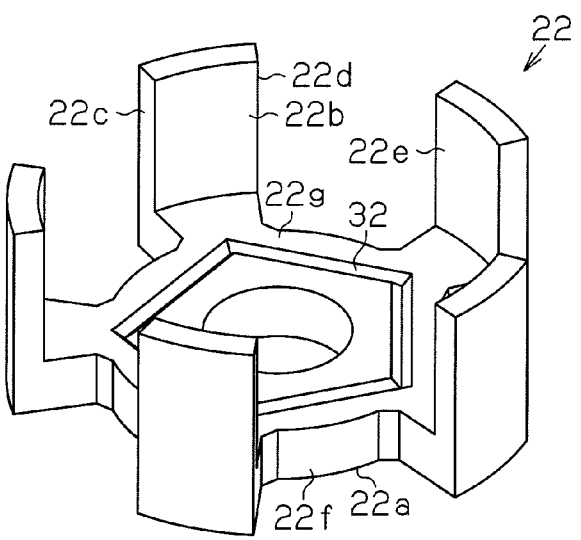
Figure 8:
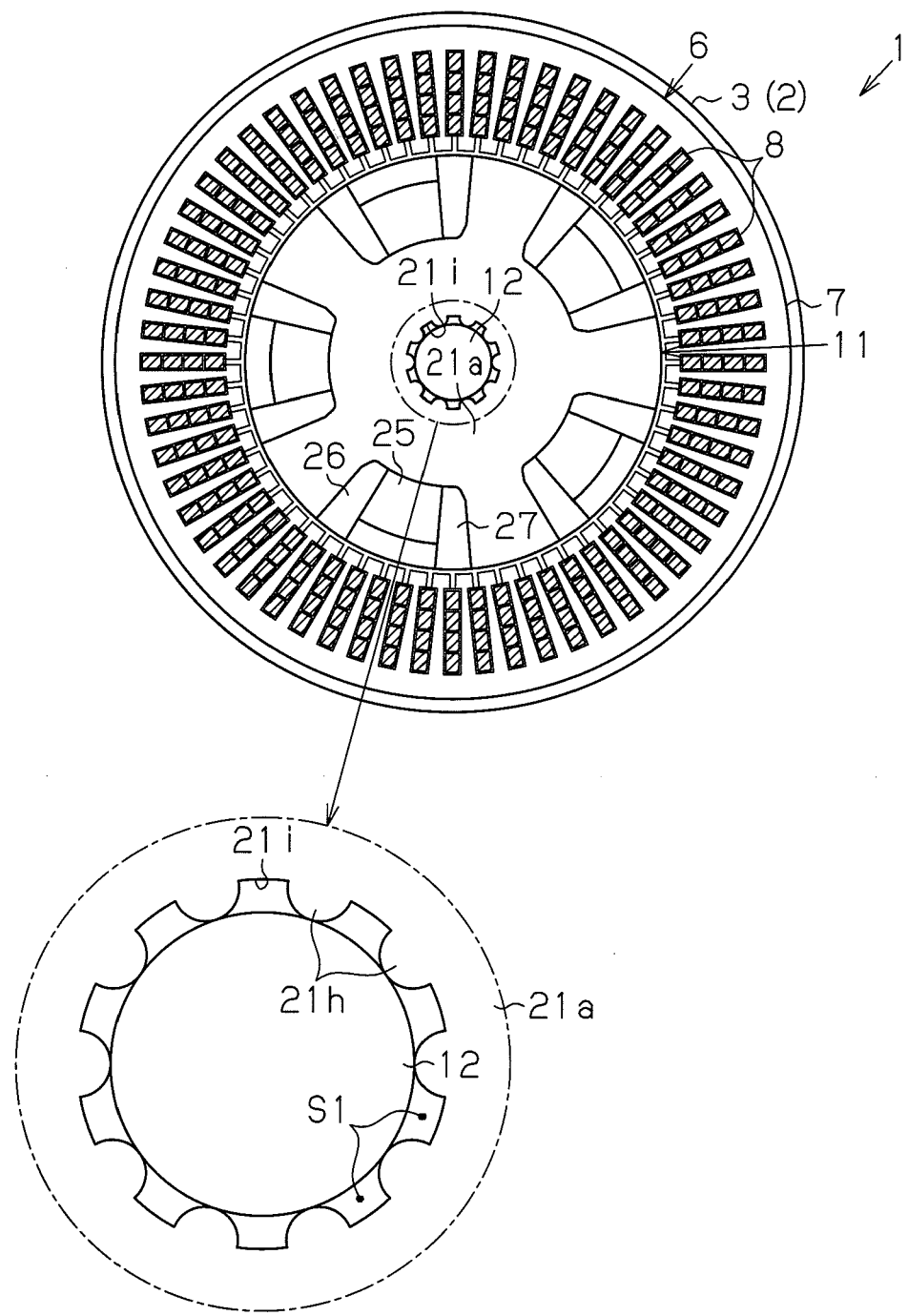
FIG. 8 is a plan view of a motor according to a second embodiment of the present invention.
Figure 9:
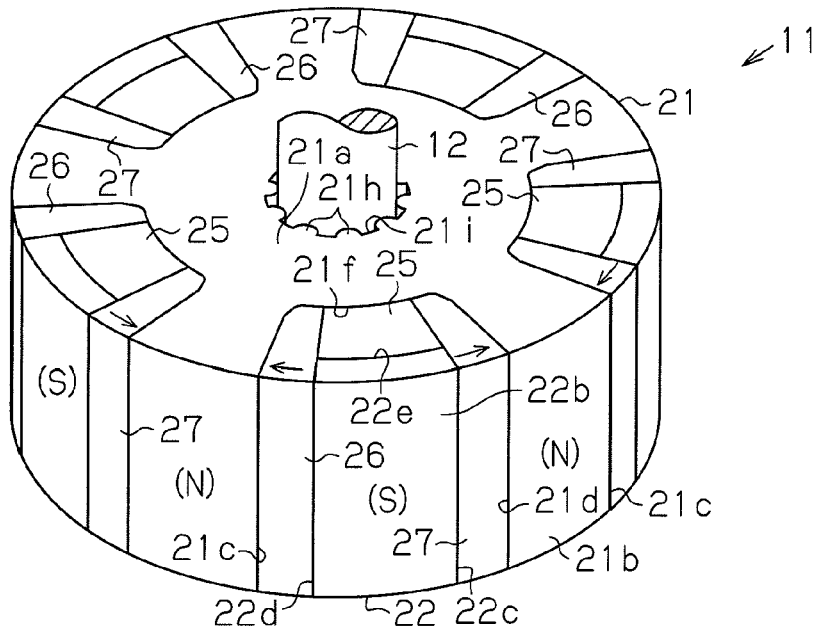
FIG. 9 is a perspective view of a rotor of FIG. 8.
Figure 10:
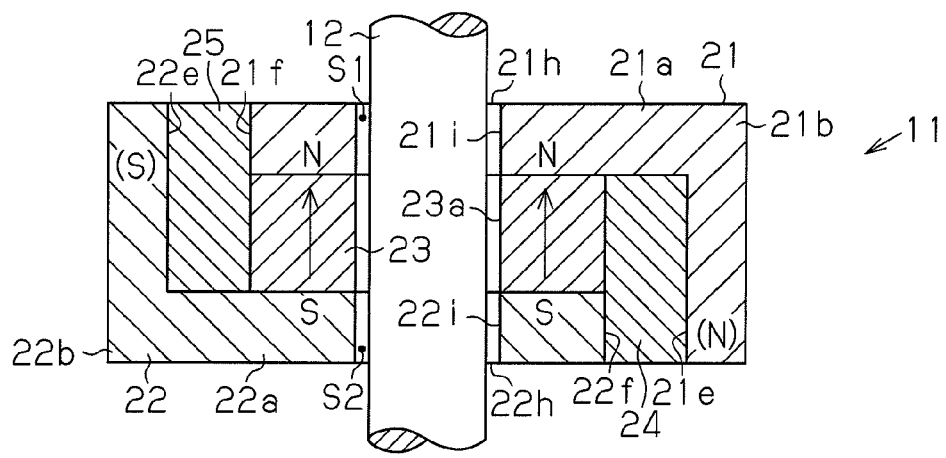
FIG. 10 is a cross-sectional view of the rotor of FIG. 9.

The first and second slits 31, 32 may have the shapes shown in FIGS. 7A to 7C. In FIGS. 7A to 7C, the second slit 32 of the second rotor core 22 is illustrated by way of example. In the example shown in FIG. 7A, the second slit 32 extends spirally from the radially inner side to the radially outer side. This configuration obtains the same advantages as the present embodiment.

In the example shown in FIG. 7B, the second slit 32 is ring-shaped and extends along the circumferential direction about the axis of the second rotor core 22. In the example shown in FIG. 7C, the second slit 32 has a polygonal shape (the example of FIG. 7C shows a regular pentagon) extending about the axis of the second rotor core 22. In the example shown in FIG. 7C, the vertices of the regular pentagon are located at the inner sides of the second claw-poles 22b. The configurations shown in FIGS. 7B and 7C also obtain advantage (1) of the present embodiment.

In the configurations of the first embodiment and FIGS. 7A to 7C, the first and second adhesive recesses have slit forms but may be a plurality of holes formed in the magnet fixing surfaces 21g and 22g.

In the first embodiment, the first and second slits 31, 32 are grooves having V-shaped cross-sections but may be grooves having U-shaped cross-sections, square-bracket-shaped cross-sections, or polygonal cross-sections, for example.

In the first embodiment, the number of first and second slits 31 and 32 is five, but is not particularly limited in such a manner. For example, the number of first and second slits 31 and 32 may be changed in accordance with the change in the number of first and second claw-poles 21b and 22b. For example, two first slits 31 (or second slits 32) may be arranged between the first claw-poles 21b (or second claw-poles 22b).

In the first embodiment, the first and second slits 31, 32 are formed in the first and second core bases 21a and 22a, but are not limited in such a manner. For example, the first and second slits 31 and 32 may be formed in the axial end faces 23a and 23b of the annular magnet 23, or may be formed in both first and second core bases 21a and 22a and the annular magnet 23.

In the first embodiment, the adhesive layer B is formed outside the first and second slits 31 and 32 between the magnet fixing surfaces 21g and 22g and the annular magnet 23, but is not limited in such a manner. For example, the adhesive layer B may be omitted, and the area outside the first and second slits 31 and 32 in the magnet fixing surfaces 21g and 22g may be brought in contact with the annular magnet 23 in the axial direction. Such a configuration substantially eliminates the gap between the annular magnet 23 and the area outside the first and second slits 31 and 32 in the magnet fixing surfaces 21g and 22g and further suppresses the magnetic resistance between the annular magnet 23 and the first and second rotor cores 21 and 22. This suppresses decreases in the motor performance, or motor output.

In the first embodiment, a single annular magnet 23 is used as the field magnet. Instead, a permanent magnet that is divided into sections may be arranged around the rotation shaft 12 between the first and second core bases 21a and 22a in the axial direction.

In the first embodiment, although not particularly stated, the first and second rotor cores 21 and 22 and the armature core 7 may be configured by stacking magnetic metal plates or molding magnetic powder bodies, for example.

In the first embodiment, the method for winding a coil around the teeth of the stator 6 is not particularly stated but may be concentrated winding or distributed winding.

A second embodiment of the present invention will now be described with reference to FIGS. 8 to 11. Same reference numerals are given to those components that are the same as the corresponding components of the first embodiment. Such components will not be described.

As shown in FIGS. 8 to 11, a first insertion hole 21i, through which the rotation shaft 12 is inserted, extends axially through a central portion of the first core base 21a. Supporting projections 21h project inward from a circumferential wall of the first insertion hole 21i and contact the rotation shaft 12 in the radial direction. Ten supporting projections 21h are formed at equal intervals in the circumferential direction. Each supporting projection 21h is formed over the entire first insertion hole 21i in the axial direction (refer to FIG. 11). Each supporting projection 21h projects to have an arcuate shape as viewed in the axial direction so that a distal end of the supporting projection 21h comes into linear contact with the circumferential surface of the rotation shaft 12. This supports the rotation shaft 12. In this manner, gaps S1 (refer to FIG. 10) are formed between the first insertion hole 21i and the rotation shaft 12 at areas other than the distal ends of the supporting projections 21h. The supporting projections 21h of the first insertion hole 21i fix the first rotor core 21 and the rotation shaft 12 so that the first rotor core 21 and the rotation shaft 12 are integrally rotatable.

Figure 11:
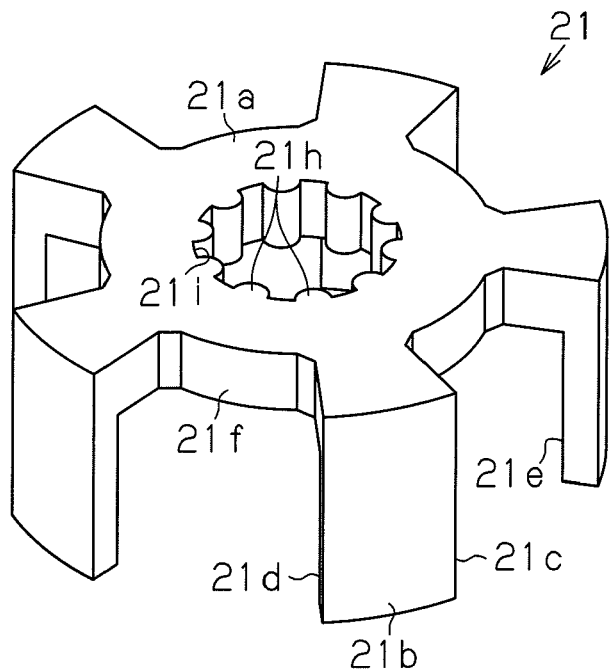
FIG. 11 is a perspective view of a rotor core of FIG. 9.
Figure 11:
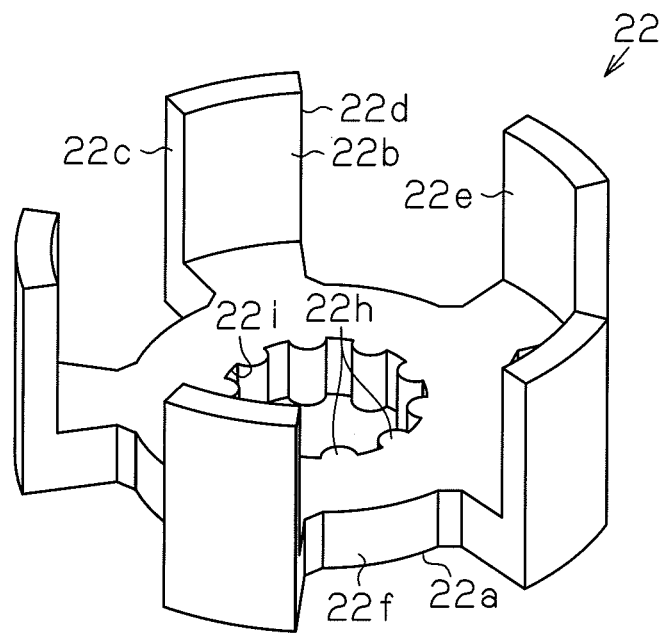

The second rotor core 22 is identical in shape with the first rotor core 21, and a second insertion hole 22i identical in shape with the first insertion hole 21i of the first rotor core 21 is formed in the central portion of a generally disk-shaped second core base 22a (refer to FIG. 11). Supporting projection 22h, similar to the supporting projections 21h of the first insertion hole 21i, are formed in the second insertion hole 22i, and gaps S2 (refer to FIG. 10) are formed between the second insertion hole 22i and the rotation shaft 12 at areas other than the distal ends of the supporting projections 22h. The supporting projections 22h of the second insertion hole 22i fix the second rotor core 22 and the rotation shaft 12 so that the second rotor core 22 and the rotation shaft 12 are integrally rotatable.

The rotation shaft 12 is inserted into a through-hole 23c formed in the central portion of the annular magnet 23, and a gap is formed between the inner circumferential surface of the annular magnet 23 and the rotation shaft 12.

The operation of the motor 1 according to the second embodiment will now be described.

When three-phase drive current is supplied to the segment conductor (SC) winding 8 through a power supply circuit in the circuit accommodation box 5, a magnetic field for rotating the rotor 11 is generated in the stator 6. This rotates and drives the rotor 11. In this case, magnetic flux of the annular magnet 23 mainly acts on the first and second claw-poles 21b and 22b through the first and second core bases 21a and 22a, and the magnetic flux forms effective magnetic flux for generating the torque of the rotor 11. Some of the magnetic flux of the annular magnet 23 forms short-circuit magnetic flux that extends from the first insertion hole 21i of the first core base 21a through the rotation shaft 12 and from the second insertion hole 22i to the second core base 22a. In the second embodiment, the supporting projections 21h and 22h that project inward and contact the rotation shaft 12 are formed in the insertion holes 21i and 22i. This reduces the area of contact between the rotation shaft 12 and the insertion holes 21i and 22i. This causes magnetic saturation in the supporting projections 21h and 22h and increases the magnetic resistance thereby decreasing the short-circuit magnetic flux flowing from the insertion holes 21i and 22i to the rotation shaft 12. As a result, the effective magnetic flux that acts on the first and second claw-poles 21b and 22b increases. This increases the motor output.

The second embodiment has the advantages described below.

(5) The rotation shaft 12 of the rotor 11 is axially inserted into and fixed to the first and second insertion holes 21i and 22i formed in the first and second core bases 21a and 22a. The supporting projections 21h and 22h that project inward and contact the rotation shaft 12 is arranged in the insertion holes 21i and 22i. That is, the rotation shaft 12 is supported by the supporting projections 21h and 22h formed in the insertion holes 21i and 22i thereby decreasing the area of contact between the insertion holes 21i and 22i and the rotation shaft 12, and increasing the magnetic resistance between the insertion holes 21i and 22i and the rotation shaft 12. This decreases the short-circuit magnetic flux passing by the rotation shaft 12, that is, the short-circuit magnetic flux from the first and second rotor cores 21, 22 to the rotation shaft 12. Thus, the magnetic flux of the annular magnet 23 may be effectively used to increase the motor output.

(6) The supporting projections 21h and 22h project to have an arcuate shape as viewed in the axial direction so that the supporting projections 21h and 22h are in linear contact with the rotation shaft 12. This further decreases the area of contact between the insertion holes 21i and 22i and the rotation shaft 12. As a result, the short-circuit magnetic flux passing by the rotation shaft 12, that is, the short-circuit magnetic flux from the first and second rotor cores 21, 22 to the rotation shaft 12 is further decreased.

(7) The supporting projections 21h and 22h are arranged at equal intervals in the circumferential direction in the insertion holes 21i and 22i. This supports the rotation shaft 12 in a balanced manner in the circumferential direction.

(8) The supporting projections 21h and 22h are respectively formed over the entire first and second insertion holes 21i and 22i in the axial direction. This allows for the first and second insertion holes 21i and 22i to be rigidly fixed to the rotation shaft 12.

A third embodiment of the present invention will now be described with reference to FIGS. 12A and 12B. Same reference numerals are given to those components that are the same as the corresponding components of the first embodiment. Such components will not be described.

Figure 12A:
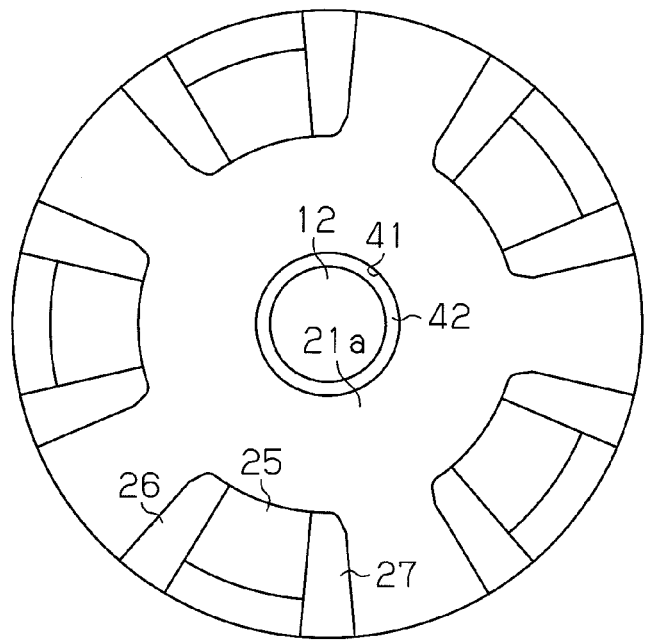
FIG. 12A is a plan view of a rotor according to a third embodiment of the present invention.
Figure 12B:
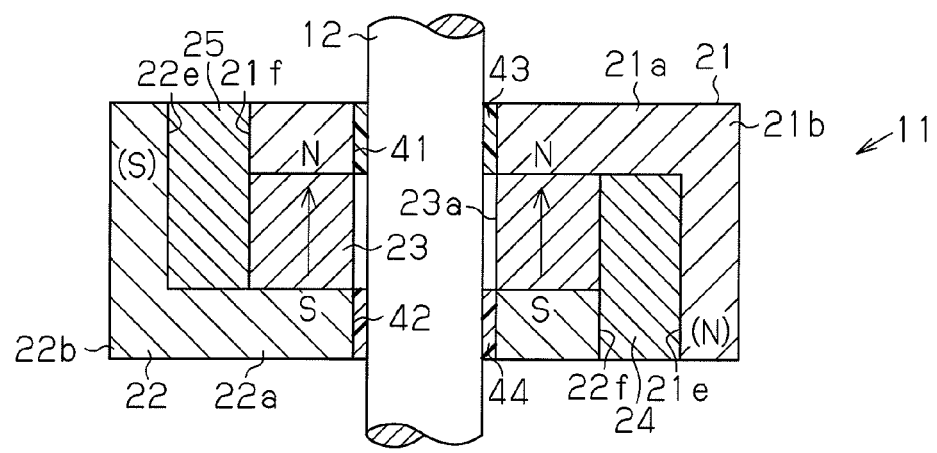
FIG. 12B is a cross-sectional view of the rotor of FIG. 12A.

As shown in FIGS. 12A and 12B, a first insertion hole 41 and a second insertion hole 42, which are circular and into which the rotation shaft 12 is inserted, extend in the axial direction through the central portions of the first and second core bases 21a and 22a, respectively. The first and second insertion holes 41 and 42 have equal diameters set to be greater than the diameter of the rotation shaft 12. Cylindrical non-magnetic members 43 and 44 (non-magnetic bodies) are arranged between the rotation shaft 12 and the first and second insertion holes 41 and 42. Each of the non-magnetic members 43 and 44 is made of resin (non-magnetic resin). The inner circumferential surfaces of the non-magnetic members 43 and 44 are in contact with the entire outer circumferential surface of the rotation shaft 12 in the circumferential direction. The non-magnetic members 43 and 44 fix the rotation shaft 12 to the first and second insertion holes 41 and 42. Thus, the first and second rotor cores 21 and 22 and the rotation shaft 12 are integrally rotatable.

In such a configuration, the non-magnetic members 43 and 44 increase the magnetic resistance between the rotation shaft 12 and the first and second insertion holes 41 and 42. This decreases the short-circuit magnetic flux passing by the rotation shaft 12 through the first and second insertion holes 41 and 42. As a result, the effective magnetic flux acting on the first and second claw-poles 21b and 22b increases, and the motor output increases.

The third embodiment has the advantages described below.

(9) The non-magnetic members 43 and 44 are respectively arranged between the rotation shaft 12 and the first and second insertion holes 41 and 42. The non-magnetic members 43 and 44 increase the magnetic resistance between the rotation shaft 12 and the first and second insertion holes 41 and 42. This decreases the short-circuit magnetic flux passing by the rotation shaft 12 through the first and second insertion holes 41 and 42. Thus, the magnetic flux of the annular magnet 23 may be effectively used to increase the motor output.

(10) The non-magnetic members 43 and 44 are in contact with the entire circumferential surface of the rotation shaft 12 in the circumferential direction. This rigidly fixes the first and second rotor cores 21 and 22 to the rotation shaft 12.

The second and third embodiments of the present invention may be modified as described below.

In the second embodiment, the supporting projections 21h and 22h are arranged at equal intervals in the circumferential direction in the insertion holes 21i and 22i, but not limited in such a manner. For example, the supporting projections 21h and 22h may be arranged at non-equal intervals in the circumferential direction. In the second embodiment, ten supporting projections 21h and ten supporting projections 22h are formed. However, the number of supporting projections 21h and 22h may be changed in accordance with the configuration.

In the second embodiment, the supporting projections 21h and 22h have an arcuate shape as viewed in the axial direction so that the supporting projections 21h and 22h are in linear contact with the rotation shaft 12, but are not limited in such a manner. For example, the supporting projections 21h and 22h may have a triangular shape so that the supporting projections 21h and 22h are in linear contact with the rotation shaft 12. Further, for example, the supporting projections 21h and 22h may have a tetragonal shape so that the supporting projections 21h and 22h are in surface contact with the rotation shaft 12.

In the second embodiment, the gaps S1 and S2 between the rotation shaft 12 and the first and second insertion holes 21i and 22i may be filled with non-magnetic bodies including a resin or the like, and the non-magnetic bodies may be in close contact with the circumferential surface of the rotation shaft 12. This increases the area of contact between the rotation shaft 12 and the first and second rotor cores 21 and 22, and allows for the first and second rotor cores 21 and 22 to be rigidly fixed to the rotation shaft 12.

In the third embodiment, a resin is used for the non-magnetic members 43 and 44. Instead, a non-magnetic material such as stainless steel, for example, may be used.

In the third embodiment, projections similar to the supporting projections 21h and 22h of the second embodiment may be formed on the inner circumferential surface of the non-magnetic members 43 and 44. This decreases the area of contact between the rotation shaft 12 and the non-magnetic members 43 and 44, and thereby decreases the short-circuit magnetic flux passing by the rotation shaft 12 through the first and second insertion holes 41 and 42. As a result, the motor output may be further increased.

In the second and third embodiments, the shape and number of the first and second claw-poles 21b, 22b may be changed in accordance with the configuration.

In the second and third embodiments, a single annular magnet 23 is used for the field magnet. However, a permanent magnet divided into a plurality of sections may be arranged around the rotation shaft 12 between the first and second core bases 21a and 22a in the axial direction.

In the second and third embodiments, the first and second rear surface auxiliary magnets 24 and 25 and the inter-pole magnets 26 and 27 may be omitted.

In the second and third embodiments, although not particularly stated, the first and second rotor cores 21, 22 and the armature core 7 may be configured by stacking magnetic metal plates or molding magnetic powder bodies, for example.

In the second and third embodiments, the method for winding a coil around the teeth of the stator 6 is not particularly stated but may be concentrated winding or distributed winding.

A fourth embodiment of the present invention will now be described with reference to FIGS. 13 to 15. Same reference numerals are given to those components that are the same as the corresponding components of the first embodiment. Such components will not be described.

Figure 13:
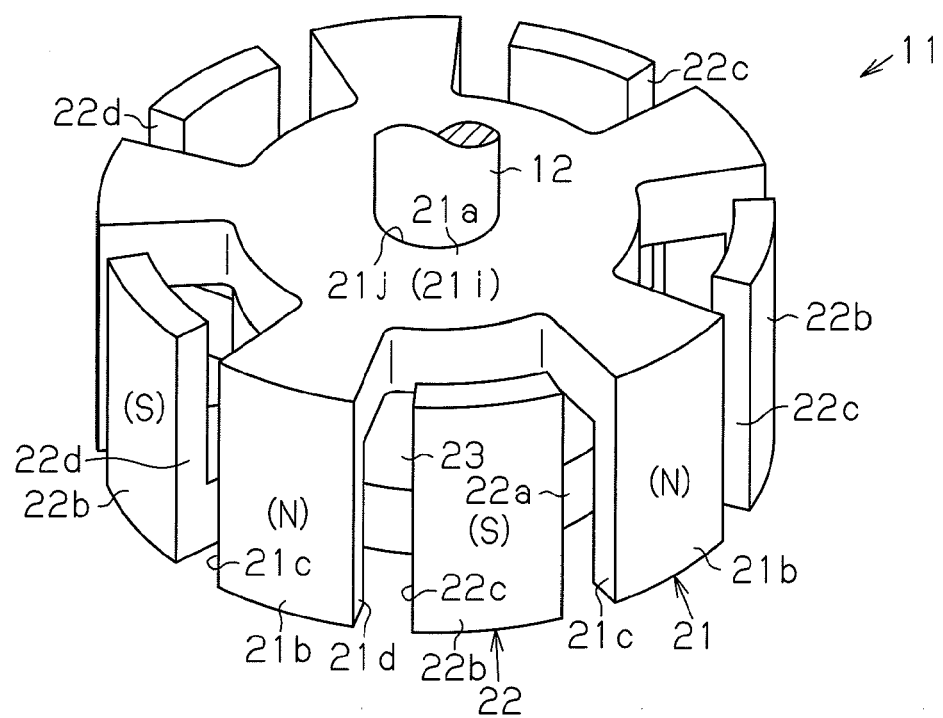
FIG. 13 is a perspective view of a rotor according to a fourth embodiment of the present invention.
Figure 14A:
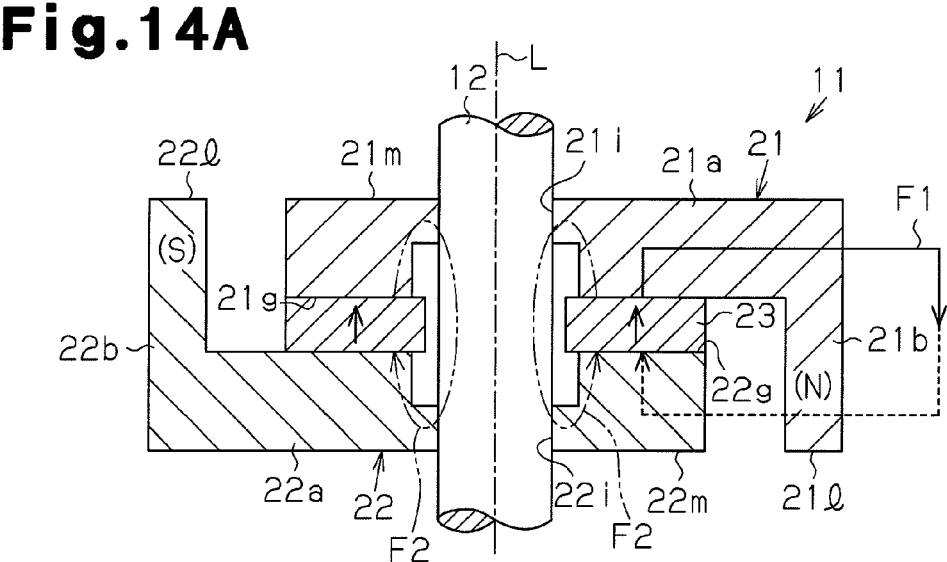
FIG. 14A is a cross-sectional view of the rotor of FIG. 13.
Figure 14B:
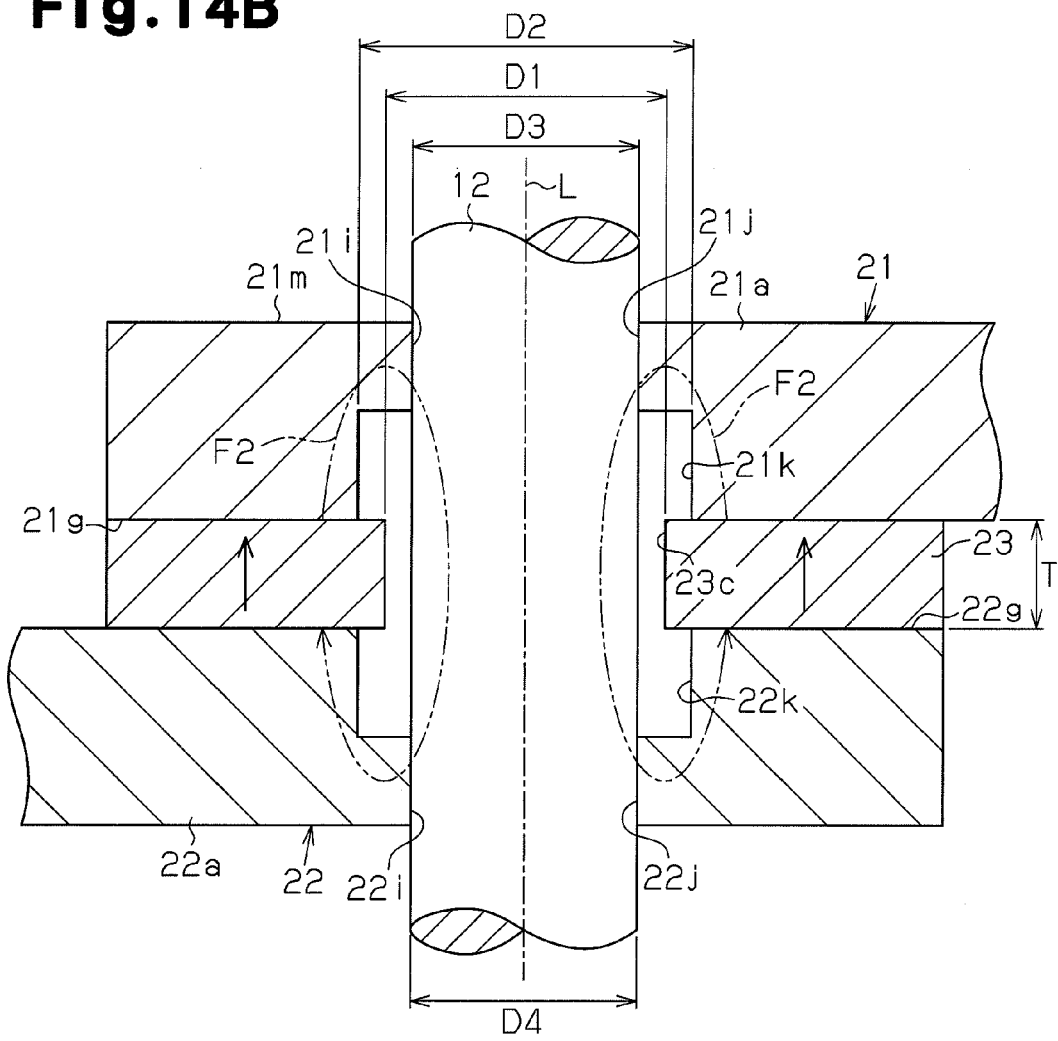
FIG. 14B is an enlarged view of the main part of FIG. 14A.

As shown in FIGS. 13 and 14A, the rotor 11 includes the rotation shaft 12, the first rotor core 21, the second rotor core 22, and the annular magnet 23 serving as the field magnet (refer to FIGS. 14A and 14B).

The first rotor core 21 includes a generally disk-shaped first core base 21a. The first insertion hole 21i, through which the rotation shaft 12 is inserted, extends through a central portion of the first core base 21a. As shown in FIG. 14B, the first insertion hole 21i includes a fixing portion 21j and a separated portion 21k, which are arranged in the axial direction of the rotation shaft 12. The fixing portion 21j and the separated portion 21k are portions having different inner diameters in the first insertion hole 21i.

In detail, the fixing portion 21j and the separated portion 21k are circular and extend about the axis L of the rotation shaft 12 as viewed from the axial direction. An inner diameter D2 (diameter) of the separated portion 21k is set to be larger than the inner diameter D3 (diameter) of the fixing portion 21j. The separated portion 21k is formed on the axially inner side (position closer to the annular magnet 23) of the first core base 21a, and the fixing portion 21j is formed on the axially outer side of the first core base 21a. The inner diameter D3 of the fixing portion 21j is slightly smaller than the diameter D4 of the rotation shaft 12. The rotation shaft 12 is pressed into and fixed to the fixing portion 21j. That is, the separated portion 21k is configured to be spaced apart in the radial direction from the circumferential surface of the rotation shaft 12. When the first core base 21a and the rotation shaft 12 are fixed at the fixing portion 21j of the first insertion hole 21i, the first rotor core 21 and the rotation shaft 12 are integrally rotatable. The fixing portion 21j and the separated portion 21k are configured to have substantially equal lengths in the axial direction.

The second rotor core 22 is identical in shape with the first rotor core 21, and a second insertion hole 22i identical in shape with the first insertion hole 21i of the first rotor core 21 is formed in the central portion of the generally disk-shaped second core base 22a, as shown in FIGS. 14A and 14B. In other words, a fixing portion 22j and a separated portion 22k identical in shape (same diameter) with the fixing portion 21j and the separated portion 21k of the first insertion hole 21i are formed in the second insertion hole 21i. The fixing portion 22j and the separated portion 22k of the second insertion hole 22i have the same diameter as the fixing portion 21j and the separated portion 21k of the first insertion hole 21i. Thus, the inner diameter of the fixing portion 22j and the inner diameter of the separated portion 22k are respectively indicated as the inner diameter D3 and the inner diameter D2 to facilitate description. When the second core base 22a and the rotation shaft 12 are fixed to each other at the fixing portion 22j of the second insertion hole 22i, the second rotor core 22 and the rotation shaft 12 are integrally rotatable.

The first core base 21a and the second core base 22a are arranged in an opposing manner so that the separated portions 21k and 22k of the first and second insertion holes 21i and 22i face each other in the axial direction of the rotation shaft 12. The annular magnet 23 is arranged (held) between the first core base 21a and the second core base 22a in the axial direction. Specifically, the annular magnet 23 is in close contact with an axially inner end face (magnet fixing surface) 21g of the first core base 21a and an axially inner end face (magnet fixing surface) 22g of the second core base 22a. The two axial end faces of the annular magnet 23 have a planar shape extending perpendicular to the axis L of the rotation shaft 12.

The annular magnet 23 is ring-shaped, and a through-hole 23c, through which the rotation shaft 12 is inserted, is formed in the central portion of the annular magnet 23. The outer circumferential surface and the inner circumferential surface (through-hole 23c) of the annular magnet 23 are circular and extend about the axis L of the rotation shaft 12 as viewed from the axial direction. The outer diameter of the annular magnet 23 is set to be equal to the outer diameters of the first and second core bases 21a and 22a. The inner diameter of the annular magnet 23 (diameter D1 of the through-hole 23c) is set to be greater than the diameter D4 of the rotation shaft 12. In other words, the outer circumferential surface of the rotation shaft 12 and the through-hole 23c are radially spaced apart.

The separated portions 21k and 22k of the first and second insertion holes 21i and 22i are arranged on both sides in the axial direction of the through-hole 23c of the annular magnet 23. In other words, a gap between the rotation shaft 12 and the annular magnet 23 extends toward two sides in the axial direction and into the first and second insertion holes 21i and 22i and the rotation shaft 12. The inner diameter of the annular magnet 23, that is, the diameter D1 of the through-hole 23c, is set to be smaller than the inner diameter D2 of each of the separated portions 21k and 22k of the first and second insertion holes 21i and 22i.

The first claw-poles 21b are radially spaced apart from the outer circumferential surface of the second core base 22a and the outer circumferential surface of the annular magnet 23. Distal end faces 21l of the first claw-poles 21b are flush with axially outer end faces 22m of the second core base 22a. In the same manner, the second claw-poles 22b are radially spaced apart from the outer circumferential surface of the first core base 21a and the outer circumferential surface of the annular magnet 23. Distal end faces 22l of the second claw-poles 22b are flush with axially outer side end faces 21m of the first core base 21a.

The operation of the motor 1 of the fourth embodiment will now be described.

Referring to FIGS. 14A and 14B, in the same manner as the motor 1 of the second embodiment, the motor 1 of the fourth embodiment functions to generate the effective magnetic flux F1 and the short-circuit magnetic flux F2.

The first and second insertion holes 21i and 22i respectively include the separated portions 21k and 22k that are spaced apart from the rotation shaft 12. This reduces the area of contact between the rotation shaft 12 and the insertion holes 21i and 22i (fixing portions 21j and 22j), while ensuring the axial thickness of each of the core bases 21a and 22a. Thus, magnetic saturation occurs at the fixing portions 21j and 22j and increases the magnetic resistance. This reduces the short-circuit magnetic flux F2. Consequently, the effective magnetic flux F1 acting on the first and second claw-poles 21b and 22b increases. This increases the motor output.

In the rotor 11 of the fourth embodiment, the inner diameter D2 of the separated portions 21k and 22k is set to be greater than the diameter D1 of the through-hole 23c in the annular magnet 23. In contrast, in a configuration in which the inner diameter D2 of the separated portions 21k and 22k is smaller than the diameter D1 of the through-hole 23c, the first and second core bases 21a and 22a face each other in the axial direction through a gap formed in the radially inner side of the through-hole 23c. Thus, the magnetic flux is short-circuited between the opposing surfaces of the core bases 21a and 22a. In this regards, in the fourth embodiment, the core bases 21a and 22a do not face each other in the axial direction at the radially inner side of the through-hole 23c since the diameter D1 of the through-hole 23c is smaller than the inner diameter D2 of each of the separated portions 21k and 22k. This reduces the short-circuit magnetic flux F2 between the core bases 21a and 22a.

Figure 15:
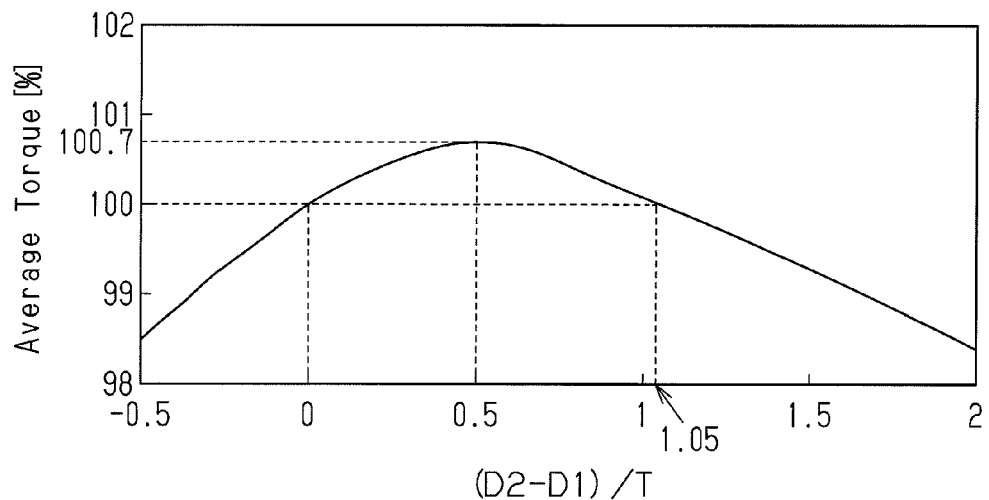
FIG. 15 is a graph showing the relationship between the ratio (D2−D1)/T of a difference between an inner diameter D2 of a separated portion and a diameter D1 of a through-hole in FIG. 14B to an axial thickness T of an annular magnet, and an average torque of a motor.

FIG. 15 shows the relationship between the ratio (D2−D1)/T of the difference of the inner diameter D2 of the separated portions 21k and 22k and the diameter D1 of the through-hole 23c to the axial thickness T of the annular magnet 23, and an average torque of the motor 1. In FIG. 15, the average torque is 100% when (D2−D1)/T=0 is satisfied, that is, when the inner diameter D2 of the separated portions 21k and 22k and the diameter D1 of the through-hole 23c are equal to each other. As shown in FIG. 15, the average torque decreases as (D2−D1)/T decreases from 0 (i.e., as the inner diameter D2 of the separated portions 21k and 22k becomes smaller than the diameter D1 of the through-hole 23c). That is, the average torque is less than 100% in the range of (D2−D1)/T<0.

As (D2−D1)/T increases from 0 (i.e., as the inner diameter D2 of the separated portions 21k and 22k becomes greater than the diameter D1 of the through-hole 23c), the average torque is changed by first increasing and then decreasing after reaching the a maximum value. Specifically, when (D2−D1)/T is in the range from 0 to 0.5, the average torque increases. As (D2−D1)/T approaches 0.5, the increase rate gradually decreases, and the average torque reaches the maximum value of approximately 100.7% at (D2−D1)/T=0.5. When (D2−D1)/T becomes greater than 0.5, the average torque decreases from the maximum value, and the average torque becomes 100% at (D2−D1)/T=1.05. When (D2−D1)/T is in the range of 1.05 or greater, the average torque is less than 100%. That is, in the range of 0<(D2−D1)/T<1.05, the average torque exceeds 100%. Accordingly, by setting the inner diameter D2 of the separated portions 21k and 22k, the diameter D1 of the through-hole 23c, and the axial thickness T of the annular magnet 23 in the range of 0<(D2−D1)/T<1.05, an increase in the average torque may be expected, and the effect of increasing the average torque becomes greatest at (D2−D1)/T=0.5.

The fourth embodiment has the advantages described below.

(11) The diameter D1 of the through-hole 23c of the annular magnet 23 is set to be greater than the diameter D4 of the rotation shaft 12. The inner circumferential walls of the first and second insertion holes 21i and 22i respectively include the fixing portions 21j and 22j, which are fixed to the rotation shaft 12, and the separated portions 21k and 22k, which are located closer to the annular magnet 23 than the fixing portions 21j and 22j and spaced apart in the radial direction from the rotation shaft 12. Thus, the area of contact between the rotation shaft 12 and the fixing portions 21j and 22j of the insertion holes 21i and 22i decreases while obtaining the axial thickness of each of the core bases 21a and 22a and avoiding decreases in the rotor performance. This increases the magnetic resistance between the rotation shaft 12 and the fixing portions 21j and 22j. As a result, the short-circuit magnetic flux passing by the rotation shaft 12 decreases. This allows for the magnetic flux of the annular magnet 23 to be effectively used to increase the motor output.

(12) The separated portion 21k of the first core base 21a has the same inner diameter D2 as the separated portion 22k of the second core base 22a, and the inner diameter D2 of the separated portions 21k and 22k is greater than the diameter D1 of the corresponding through-hole 23c. Thus, the first core base 21a and the second core base 22a are configured without axially facing each other through a gap. This allows for a decrease in the short-circuit magnetic flux F2 between the first and second core bases 21a and 22a, and consequently, increases the motor output.

(13) The first rotor core 21, the second rotor core 22, and the annular magnet 23 are configured to satisfy 0<(D2−D1)/T<1.05, where D2 is the inner diameter of the separated portions 21k and 22k, D1 is the diameter of the through-hole 23c, and T is the axial thickness of the annular magnet 23. This increases the average torque of the rotor 11 as compared to a configuration satisfying (D2−D1)/T=0, that is, in which the inner diameter D2 of the separated portions 21k and 22k is equal to the diameter D1 of the through-hole 23c of the annular magnet 23 (refer to FIG. 15).

The fourth embodiment of the present invention may be modified as below.

Figure 16:
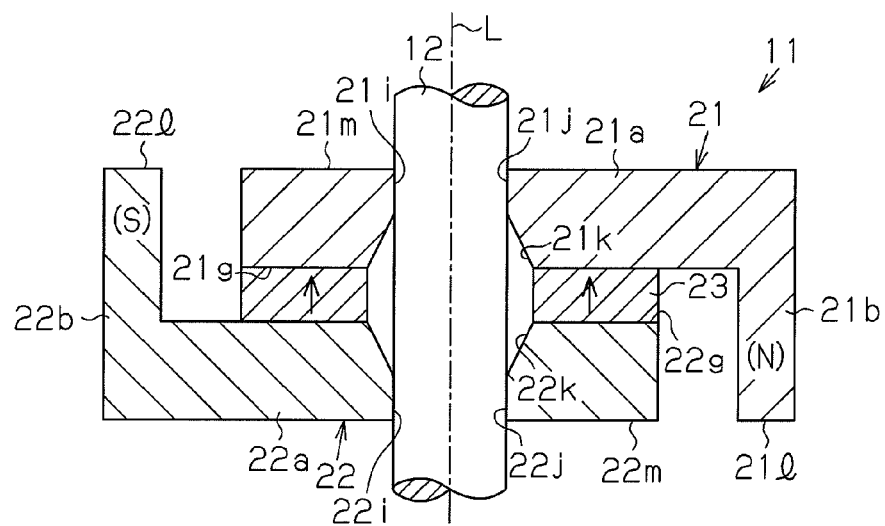
FIGS. 16 to 18 are cross-sectional views showing other examples of the rotor.
Figure 17:
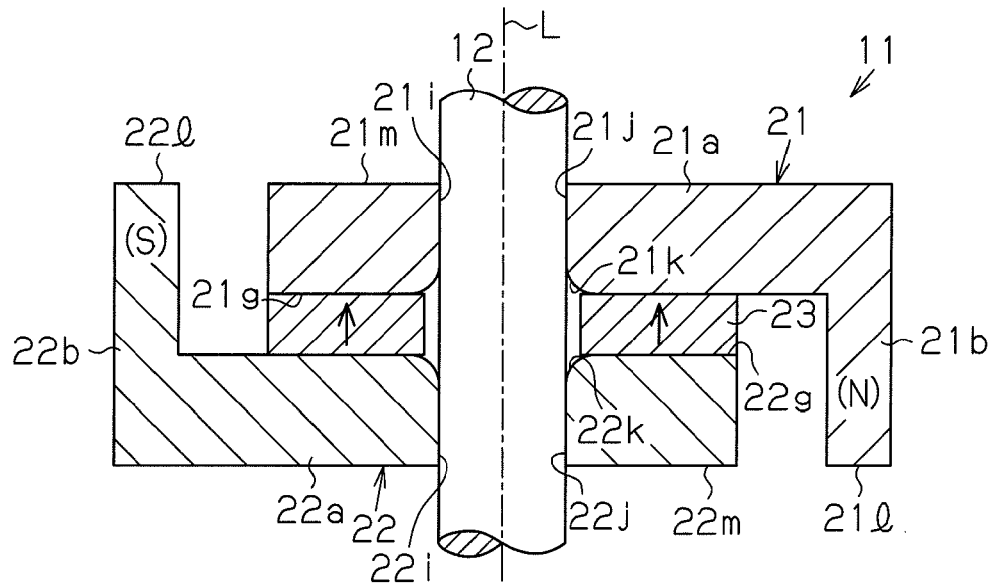

The separated portions 21k and 22k of the fourth embodiment may have shapes shown in FIGS. 16 and 17, for example. In the example shown in FIG. 16, the separated portions 21k and 22k have a tapered shape in which the diameter enlarges toward the axially inner side of the rotor 11. In the example shown in FIG. 17, the portion connecting the fixing portions 21j and 22j and the axially inner end faces 21g and 22g of the core bases 21a, 22a are curved shape, and the curved portions define the separated portions 21k and 22k. The configurations shown in FIGS. 16 and 17 obtain the same advantages as the fourth embodiment.

Figure 18:
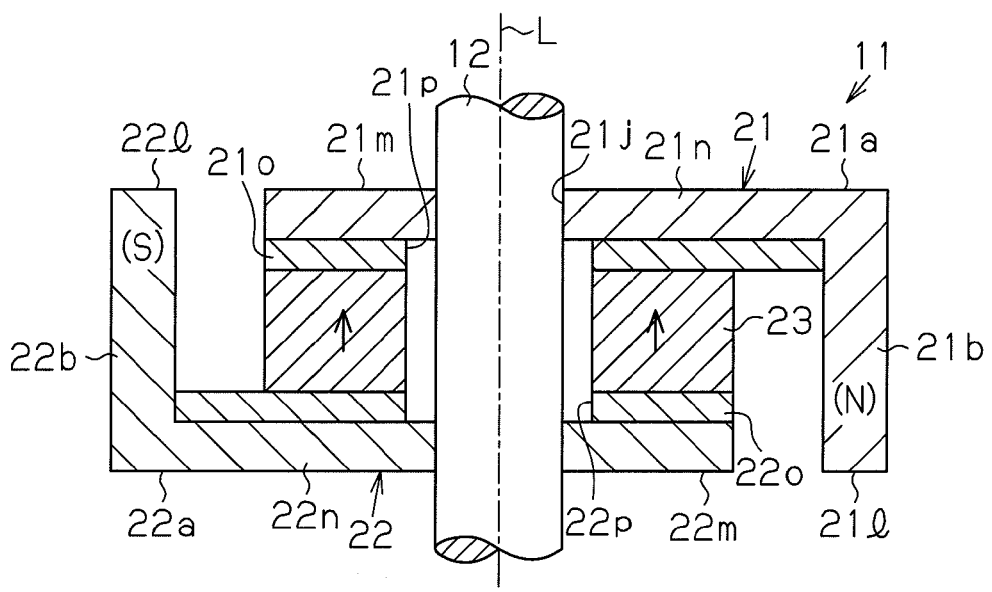

In the fourth embodiment, each of the core bases 21a and 22a is configured by a single member, but is not particularly limited in such a manner, and may be configured as shown in FIG. 18, for example. In FIG. 18, the first core base 21a includes a base main body 21n formed integrally with the first claw-poles 21b, and a first interposing member 21o, which is discrete from the base main body 21n. The first interposing member 21O is formed by a ring-shaped magnetic body and arranged between the base main body 21n and the annular magnet 23 in the axial direction. An insertion hole, into which the rotation shaft 12 is inserted, in the first core base 21a includes a fixing portion 21j formed in the base main body 21n and a separated portion 21p (hole) extending through the first interposing member 21o. In this manner, in the configuration shown in FIG. 18 differs from the fourth embodiment in that the fixing portion 21j and the separated portion 21p of the insertion hole of the first core base 21a are formed as separate bodies.

The second core base 22a also has a configuration similar to that of the first core base 21a and includes a base main body 22n and a second interposing member 22o. The second interposing member 22o includes a separated portion 22p that is similar to the separated portion 21p of the first interposing member 21o. The fixing portion 22j and the separated portion 22p of the insertion hole of the second core base 22a are formed as separate bodies.

Such a configuration obtains the same advantages as the fourth embodiment. Further, in such a configuration, the separated portions 21p and 22p may be changed by simply changing the shape such as the size of the inner diameter of the interposing members 21O and 22o. This easily changes the shape of the separated portions 21p and 22p without performing complicated processes on the base main bodies 21n and 22n.

In the fourth embodiment, the inner diameter D2 of the separated portions 21k and 22k is set to be greater than the diameter D1 of the through-hole 23c, but is not particularly limited in such a manner. For example, the inner diameter D2 of the separated portions 21k and 22k may be equal to the diameter D1 of the through-hole 23c. This configuration obtains advantage (12) of the fourth embodiment. The inner diameter D2 of the separated portions 21k and 22k do not have to be greater than or equal to the diameter D1 of the through-hole 23c. The inner diameter D2 of the separated portions 21k and 22k may be set to be smaller than the diameter D1 of the through-hole 23c.

In the fourth embodiment, the separated portions 21k and 22k have the same diameter but may have different diameters.

In the fourth embodiment, the gap in the radial direction between the separated portions 21k and 22k and the rotation shaft 12 may be filled with the non-magnetic body including resin, and the like, and such non-magnetic body may be closely attached to the outer circumferential surface of the rotation shaft 12. According to such configuration, the first and second rotor cores 21 and 22 are rigidly fixed to the rotation shaft 12.

In the fourth embodiment, a plurality of supporting projections that project toward the radially inner side and contacts the rotation shaft 12 may be arranged on each of the fixing portions 21j and 22j. Such a configuration decrease the area of contact between the rotation shaft 12 and the fixing portions 21j and 22j. This further decreases the short-circuit magnetic flux F2 from the first and second rotor cores 21 and 22 to the rotation shaft 12.

In the fourth embodiment, the shape and number of the first and second claw-poles 21b and 22b may be changed in accordance with the configuration.

In the fourth embodiment, a single annular magnet 23 is used for the field magnet. However, a permanent magnet divided into a plurality of sections may be arranged around the rotation shaft 12 between the first and second core bases 21a and 22a in the axial direction.

In the fourth embodiment, although not particularly stated, the first and second rotor cores 21 and 22 and the armature core 7 may be configured by stacking magnetic metal plates or molding magnetic powder bodies, for example.

In the fourth embodiment, the method for winding a coil around the teeth of the stator 6 is not particularly stated but may be concentrated winding or distributed winding.

What is claimed is:

1. A rotor including an axial direction, a circumferential direction, and a radial direction, the rotor comprising:

a first rotor core including a disk-shaped first core base, having a first magnet fixing surface, and a plurality of first claw-poles, arranged at equal intervals on an outer circumferential portion of the first core base, wherein each of the first claw-poles projects outward in the radial direction and extends in the axial direction;

a second rotor core including a disk-shaped second core base, having a second magnet fixing surface, and a plurality of second claw-poles, arranged at equal intervals on an outer circumferential portion of the second core base, wherein each of the second claw-poles projects outward in the radial direction and extends in the axial direction, and each of the second claw-poles is arranged between adjacent ones of the first claw-poles, wherein the first and second magnet fixing surfaces face to each other in the axial direction;

a permanent magnet arranged between the first core base and the second core base in the axial direction, and including a first axial end face, facing the first magnet fixing surface, and a second axial end face, facing the second magnet fixing surface, wherein the permanent magnet is magnetized in the axial direction so that the first claw-poles function as first poles and the second claw-poles function as second poles; and an adhesive that adheres the first magnet fixing surface and the first axial end face, and the second magnet fixing surface and the second axial end face, wherein the first magnet fixing surface includes a first adhesive recess, which is depressed in the axial direction and receives the adhesive, and the first axial end face does not include the first adhesive recess; and the second magnet fixing surface includes a second adhesive recess, which is depressed in the axial direction and receives the adhesive, and the second axial end face does not include the second adhesive recess.

2. The rotor according to claim 1, wherein the first adhesive recess is arranged at a position corresponding to between adjacent ones of the first claw-poles in the circumferential direction; and the second adhesive recess is arranged at a position corresponding to between adjacent ones of the second claw-poles in the circumferential direction.

3. The rotor according to claim 1, wherein the first and second adhesive recesses are groove-shaped and extend from a radially inner side to a radially outer side.

4. The rotor according to claim 1, wherein the first adhesive recess is one of a plurality of first adhesive recesses arranged at equal intervals in the circumferential direction, and the second adhesive recess is one of a plurality of second adhesive recesses arranged at equal interval in the circumferential direction.

5. A motor comprising the rotor according to claim 1.

6. A rotor including an axial direction, a circumferential direction, and a radial direction, the rotor comprising:

a first rotor core including a disk-shaped first core base, having a first insertion hole extending in the axial direction, and a plurality of first claw-poles, arranged at equal intervals on an outer circumferential portion of the first core base, wherein each of the first claw-poles projects outward in the radial direction and extends in the axial direction;

a second rotor core including a disk-shaped second core base, having a second insertion hole extending in the axial direction, and a plurality of second claw-poles, arranged at equal intervals on an outer circumferential portion of the second core base, wherein each of the second claw-poles projects outward in the radial direction and extends in the axial direction, and each of the second claw-poles is arranged between adjacent ones of the first claw-poles;

a permanent magnet including a through-hole and arranged between the first core base and the second core base in the axial direction, wherein the permanent magnet is magnetized in the axial direction so that the first claw-poles function as first poles and the second claw-poles function as second poles;

rear surface auxiliary magnets arranged radially inside the first and second claw-poles; and a rotation shaft inserted through the first and second insertion holes to extend in the axial direction, wherein the rotation shaft is fixed to inner circumferential walls of the insertion holes, wherein, each of the first and second core bases includes, on the inner circumferential wall of the corresponding insertion hole, supporting projections that project inward in the radial direction and contact the rotation shaft, the rotation shaft is inserted to the through-hole of the permanent magnet with a clearance formed between an inner peripheral surface of the through-hole and the rotation shaft, and the rear surface auxiliary magnets are in contact with an outer peripheral surface of the permanent magnet.

7. The rotor according to claim 6, wherein each of the supporting projections is in linear contact with the rotation shaft.

8. The rotor according to claim 7, wherein each of the supporting projection is formed to have an arcuate shape as viewed in the axial direction.

9. The rotor according to claim 6, wherein the supporting projections are arranged at equal intervals in a circumferential direction of the corresponding insertion hole.

10. A motor comprising the rotor according to claim 6.

11. A rotor including an axial direction, a circumferential direction, and a radial direction, the rotor comprising:

a first rotor core including a disk-shaped first core base, having a first insertion hole extending in the axial direction, and a plurality of first claw-poles, arranged at equal intervals on an outer circumferential portion of the first core base, wherein each of the first claw-poles projects outward in the radial direction and extends in the axial direction;

a second rotor core including a disk-shaped second core base, having a second insertion hole extending in the axial direction, and a plurality of second claw-poles, arranged at equal intervals on an outer circumferential portion of the second core base, wherein each of the second claw-poles projects outward in the radial direction and extends in the axial direction, and each of the second claw-pole is arranged between adjacent ones of the first claw-poles;

a permanent magnet including a through-hole extending in the axial direction and arranged between the first core base and the second core base in the axial direction, wherein the permanent magnet is magnetized in the axial direction so that the first claw-poles function as first poles and the second claw-poles function as second poles; and a rotation shaft inserted through the first and second insertion holes and the through-hole to extend in the axial direction, wherein the rotation shaft is fixed to inner circumferential walls of the first and second insertion holes, wherein the through-hole has a diameter that is larger than a diameter of the rotation shaft;

the inner circumferential wall of each of the first and second insertion holes includes a fixing portion, which is fixed to the rotation shaft, and a separated portion, which is located closer to the permanent magnet than the fixing portion and which is separated from the rotation shaft in the radial direction;

the separated portion of the first core base and the separated portion of the second core base have the same inner diameter; and the inner diameter of each of the separated portions is the same as or greater than the diameter of the through-hole of the permanent magnet.

12. The rotor according to claim 11, wherein the first rotor core, the second rotor core, and the permanent magnet are configured to satisfy $0 < (D2-D1)/T < 1.05$, where D2 represents the inner diameter of each of the separated portions, D1 represents the diameter of the through-hole, and T represents the thickness of the permanent magnet in the axial direction.

13. A motor comprising the rotor according to claim 11.

* * * * *